United States Patent
Feezell et al.

(10) Patent No.: US 10,789,351 B2
(45) Date of Patent: Sep. 29, 2020

(54) FACILITATING RESOLUTION OF A HUMAN AUTHENTICATION TEST

(71) Applicant: International Business Machines Corporation, Armonk, NY (US)

(72) Inventors: John R. Feezell, Pikeville, TN (US); Cesar Augusto Rodriguez Bravo, San Rafael de Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/430,712

(22) Filed: Feb. 13, 2017

(65) Prior Publication Data
US 2018/0232513 A1  Aug. 16, 2018

(51) Int. Cl.
G06F 21/36 (2013.01)
H04L 29/06 (2006.01)
G06Q 50/00 (2012.01)
G06Q 50/20 (2012.01)

(52) U.S. Cl.
CPC ............ *G06F 21/36* (2013.01); *G06Q 50/01* (2013.01); *G06Q 50/20* (2013.01); *H04L 63/0861* (2013.01); *G06F 2221/2133* (2013.01); *H04L 67/42* (2013.01)

(58) Field of Classification Search
CPC ...... G06F 21/36; H04L 63/0876; H04L 67/42
See application file for complete search history.

(56) References Cited

U.S. PATENT DOCUMENTS

| | | | |
|---|---|---|---|
| 7,606,918 B2 | 10/2009 | Holzman et al. | |
| 8,943,173 B1 | 1/2015 | Ton et al. | |
| 2007/0026372 A1* | 2/2007 | Huelsbergen | G09B 3/00 434/322 |

(Continued)

OTHER PUBLICATIONS

Nagalakshmi, K. Siva et al. Confident Multi-Factor Authentication on web application via Captcha Technologies. International Journal of Computer Engineering in Research Trends, vol. 2, Issue 8, Aug. 2015, pp. 516-522.

(Continued)

*Primary Examiner* — Farid Homayounmehr
*Assistant Examiner* — Suman Debnath
(74) *Attorney, Agent, or Firm* — The Steadman Law Firm PLLC

(57) ABSTRACT

An approach is described of facilitating resolution of a human authentication test. The approach may facilitate user completion of a human authentication test having at least one image while preserving security against bots. A method pertaining to such approach may include facilitating scanning of at least one image of a human authentication test from an interface of a client application. The human authentication test may be received from an image server of an authentication server system for display via the interface of the client application. The at least one image may be scanned via an image capture device. The method further may include sending to an authentication server of the authentication server system the at least one image. The method further may include receiving from the authentication server authentication text corresponding to the at least one image and displaying the authentication text.

18 Claims, 10 Drawing Sheets

(56) References Cited

U.S. PATENT DOCUMENTS

| | | | | |
|---|---|---|---|---|
| 2010/0318669 | A1* | 12/2010 | Chugh | G06F 21/36 709/229 |
| 2011/0208716 | A1* | 8/2011 | Liu | G06F 17/30247 707/710 |
| 2013/0185210 | A1 | 7/2013 | Dodson et al. | |
| 2013/0254036 | A1* | 9/2013 | Trinh | G06Q 30/0251 705/14.64 |
| 2014/0250518 | A1 | 9/2014 | Schneider | |
| 2015/0006474 | A1* | 1/2015 | Halder | G06F 17/30011 707/608 |
| 2015/0026785 | A1* | 1/2015 | Soon-Shiong | G06Q 30/0207 726/7 |
| 2015/0304322 | A1* | 10/2015 | Zaidi | G06K 9/00892 382/115 |
| 2016/0036798 | A1* | 2/2016 | Mulhearn | G06F 21/606 726/7 |
| 2016/0104041 | A1 | 4/2016 | Bowers et al. | |

OTHER PUBLICATIONS

Germanakos, Panagiotis et al. Personalization Categories and Adaptation Technologies. Human-Centred Web Adaptation and Personalization. Springer International Publishing, Feb. 20, 2016, pp. 103-135.

Dodson, Ben et al. Secure, Consumer-Friendly Web Authentication and Payments with a Phone. International Conference on Mobile Computing, Applications, and Services, Springer Berlin Heidelberg, 2010, pp. 1-21.

Macdonald, David et al. Captcha Alternatives and thoughts. W3C Wiki, Dec. 15, 2015, 4 pages. <https://www.w3.org/WAI/GL/wiki/Captcha_Alternatives_and_thoughts>.

Shet, Vinay. Are you a robot? Introducing "No CAPTCHA reCAPTCHA". Google Security Blog, Dec. 3, 2014, 9 pages. <https://security.googleblog.com/2014/12/are-you-robot-introducing-no-captcha.html>.

Warner, Oli. KittenAuth. THEPCSPY, Accessed on Feb. 6, 2017, 5 pages. <https://thepcspy.com/kittenauth>.

Douceur, John et al. ASIRRA. Microsoft Research, Accessed on Feb. 6, 2017, 2 pages. <http://research.microsoft.com/en-us/um/redmond/projects/asirra>.

Testing for Captcha (OWASP-AT-012). OWASP.org, Nov. 20, 2013, 5 pages. <https://www.owasp.org/index.php/Testing_for_Captcha_%28OWASP-AT-012%29>.

Image-Recognition CAPTCHA. Drupal.org, Feb. 1, 2016, 1 page. <https://www.drupal.org/project/ir_captcha>.

Image-Recognition CAPTCHA READ ME.txt. Drupal.org, Feb. 1, 2016, 2 pages. <http://cgit.drupalcode.org/ir_captcha/plain/README.txt?h=7.x-1.x>.

Emerging Technology From the ARXIV. Google Unveils Neural Network with "Superhuman" Ability to Determine the Location of Almost Any Image. MIT Technology Review, Feb. 24, 2016, 7 pages. <https://www.technologyreview.com/s/600889/google-unveils-neural-network-with-superhuman-ability-to-determine-the-location-of-almost/>.

Securityweek News. Researchers Devise Scalable Attack Against Google, Facebook reCaptcha. securityweek.com, Apr. 8, 2016, 5 pages. <http://www.securityweek.com/researchers-devise-scalable-attack-against-google-facebook-recaptcha>.

* cited by examiner

FACILITATING RESOLUTION OF A HUMAN AUTHENTICATION TEST

BACKGROUND

The various embodiments described herein generally relate to human authentication test resolution. More specifically, the various embodiments describe techniques of facilitating resolution of a human authentication test via an application configured to interface with an authentication server system.

Bots are scripts designed to emulate humans in the context of online communications. Bots may present numerous security and performance difficulties with regard to an online website or application, including unsolicited electronic mail, Distributed Denial of Service attacks, fraudulent website traffic, etc. Many online entities have opted to address bots by including a human authentication test such as a Completely Automated Public Turing test to tell Computers and Humans Apart (CAPTCHA). Human authentication tests are designed to distinguish humans from bots by requiring a certain action by a user, e.g., entry of designated text or selection of a designated option.

SUMMARY

The various embodiments described herein provide techniques of facilitating resolution of a human authentication test. An associated method may include facilitating scanning of at least one image of a human authentication test from an interface of a client application. The human authentication test may be received from an image server of an authentication server system for display via the interface of the client application. The at least one image may be scanned via an image capture device. The method further may include sending to an authentication server of the authentication server system the at least one image. The method further may include receiving from the authentication server authentication text corresponding to the at least one image and displaying the authentication text.

In an embodiment, the method further may include displaying promotional information relating to one or more images among the at least one image. According to such embodiment, the method further may include, responsive to a user interacting with the promotional information, identifying attributes relating to the user. In an additional embodiment, the method further may include displaying educational information relating to one or more images among the at least one image. In an additional embodiment, the method further may include displaying social networking indicia (e.g., links or icons) having a capability to relay information relating to one or more images among the at least one image to a social networking application. In an additional embodiment, the method further may include requesting from a user registration credentials as a condition of displaying the authentication text. According to such embodiment, the registration credentials may be used to facilitate collection of data relating to the user.

In a further embodiment, the authentication server may determine the authentication text by analyzing the at least one image via at least one pattern recognition algorithm to create a plurality of bytes associated with the at least one image, comparing the plurality of bytes associated with the at least one image with database information to identify at least one matching object, and determining authentication text based upon the at least one matching object. In a further alternative embodiment, the authentication server may determine the authentication text by decoding the at least one image to obtain image data, querying at least one database with the obtained image data, and determining query results based upon the obtained image data. The query results determined according to such embodiment may include the authentication text.

An additional embodiment includes a computer program product including a computer readable storage medium having program instructions embodied therewith. According to such embodiment, the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
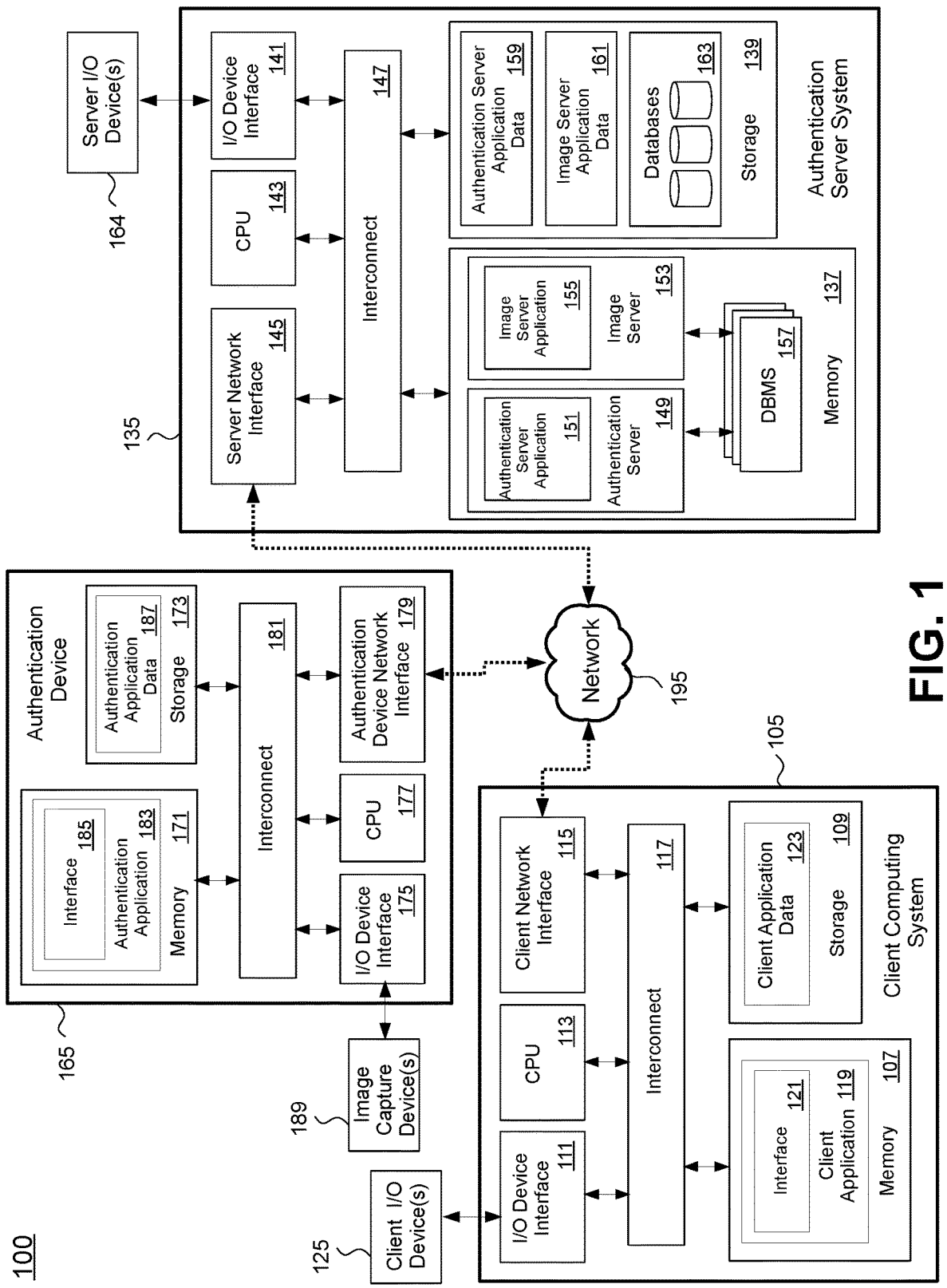
FIG. 1 illustrates a computing infrastructure, according to an embodiment.

The various embodiments described herein are directed to techniques of facilitating resolution of a human authentication test, such as a Completely Automated Public Turing test to tell Computers and Humans Apart (CAPTCHA). In the context of the various embodiments described herein, for the purpose of ensuring that a user is human, a human authentication test may provide at least one image to which the user is required to provide a response. More specifically, according to an embodiment, the human authentication test may require that the user identify at least one designated aspect of the at least one image (e.g., the central subject of the at least one image) in text form.

The various embodiments described herein may have advantages over conventional techniques. Specifically, the various embodiments may facilitate user completion of a human authentication test having at least one image while preserving security against bots. Furthermore, the various embodiments may facilitate collection of user data by requesting user credentials or by tracking/storing user activity, including activity with respect to any educational and/or promotional information provided in association with at least one image of a human authentication test. Moreover, the various embodiments may facilitate user activity with respect to social networking by enabling a user to post information with respect to at least one image of a human authentication test. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Particular embodiments describe techniques of facilitating resolution of a human authentication test. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a client computing system 105, an authentication server system 135, and an authentication device 165, each of which may be connected to a communications network 195.

Illustratively, client computing system 105 may include a memory 107, storage 109, client input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Client computing system 105 according to the various embodiments described herein may be a mobile device (e.g., a smart phone, a feature phone, a tablet device, a laptop, etc.). Alternatively, client computing system 105 may be a stationary device (e.g., a desktop computer).

Memory 107 may include a client application 119. Client application 119 may be an online or network application configured for interfacing with authentication server system 135, authentication device 165, and/or other computing systems. Client application 119 may include an application interface 121. In an embodiment, application interface 121 may be a graphical user interface (GUI) with appropriate objects to display and interface with a human authentication test provided by authentication server system 135. According to such embodiment, application interface 121 may provide text boxes, radio buttons, drop down menus, and/or similar GUI objects for the purpose of submitting a response to a human authentication test. Additionally or alternatively, application interface 121 may provide an ability to enter one or more command lines in order to submit a response to a human authentication test.

Storage 109 may include client application data 123 associated with client application 119. Client I/O device interface 111 may be communicatively coupled to one or more client I/O devices 125. CPU 113 is included in FIG. 1 to be representative of a single CPU, multiple CPUs, a single CPU having multiple processing cores, or the like. Client network interface 115 may receive data from, and/or may transmit data to, authentication server system 135 and/or authentication device 165 via network 195. Client computing system 105 may be configured to interface with other client or server systems in computing infrastructure 100.

Authentication server system 135 may include a memory 137, storage 139, a server I/O device interface 141, a CPU 143, and a server network interface 145, all of which may be interconnected via interconnect 147 (e.g., a bus). Although shown as a single computing system, authentication server system 135 is included to be representative of a single server system or multiple server systems. Although authentication server system 135 is illustrated in FIG. 1, computing infrastructure 100 may include any number of server systems. Memory 137 may include an authentication server 149 including an authentication server application 151, an image server 153 including an image server application 155, and a database management system (DBMS) 157. In an alternative embodiment, authentication server 149 and image server 153 may be included in separate server systems. In the context of the various embodiments described herein, image server 153 may host images to be displayed in a human authentication test. As further described herein, authentication server 149, or more specifically authentication server application 151, may determine authentication text required in response to a human authentication test according to one or more of the various embodiments described herein. DBMS 157 is included to be representative of a single database management system or multiple database management systems. According to a further embodiment, authentication server 149 and image server 153 each may interact with separate database management systems.

According to a further embodiment, access to image server 153 may be restricted with respect to client computing system 105, authentication device 165, and/or other computing systems associated with computing infrastructure 100. Restricted access according to such embodiment may ensure security of images hosted for purposes of a human authentication test. According to such embodiment, communication with image server 153 via network 195 may be restricted to a single port. Additionally or alternatively, according to such embodiment, all data associated with such communication may be encrypted.

Storage 139 may include authentication server application data 159, image server application data 161, and databases 163. Authentication server application 151 may generate and process authentication server application data 159 based upon interaction with client computing system 105, authentication device 165, and/or one or more other systems via network 195. Image server application 155 may process image server application data 161 based upon interaction with client computing system 105, authentication device 165, and/or one or more other systems via network 195. Authentication server application 151 may send to DBMS 157 a database query request (e.g., a query received from client computing system 105), and DBMS 157 may process such query. Image server application 155 may send to DBMS 157 a database query request, and DBMS 157 may process such query. DBMS 157 may include a software application configured to manage databases 163. Databases 163 may include one or more ontology trees or other ontological structures. While FIG. 1 illustrates three databases 163, computing infrastructure 100 may include any number of databases. According to an embodiment, DBMS 157 may send one or more requests to remote databases (not shown) via network 195.

Server I/O device interface 141 may be communicatively coupled to one or more server I/O devices 164. CPU 143 is included in FIG. 1 to be representative of a single CPU, multiple CPUs, a single CPU having multiple processing cores, or the like. Server network interface 145 may receive data from, and/or may transmit data to, client computing system 105 and/or authentication device 165 via network 195. Specifically, authentication server application 151 may accept authentication requests sent by client computing system 105 to authentication server system 135 and/or may transmit data to client computing system 105 via server network interface 145. Furthermore, authentication server application 151 may accept authentication requests sent by authentication device 165 to authentication server system 135 and/or may transmit data to authentication device 165 via server network interface 145.

Authentication device 165 may include a memory 171, storage 173, authentication input/output (I/O) device interface 175, a central processing unit (CPU) 177, and an authentication device network interface 179, all of which may be interconnected via interconnect 181 (e.g., a bus). Although shown as a single computing system, authentication device 165 is included to be representative of an authentication device or multiple authentication devices. In an embodiment, authentication device 165 may be a thin client. Authentication device 165 according to the various embodiments described herein may be a mobile device (e.g., a smart phone, a feature phone, a tablet device, a laptop, etc.). Alternatively, authentication device 165 may be a stationary device (e.g., a desktop computer).

Memory 171 may include an authentication application 183. Authentication application 183 may be an online or network application configured for interfacing with client computing system 105, authentication server system 135, and/or other computing systems. As further described herein, authentication application 183 may facilitate resolution of a human authentication test according to one or more of the various embodiments described herein. Authentication application 183 may include an application interface 185. In an embodiment, application interface 185 may be a graphical user interface (GUI) with appropriate objects to interface with a human authentication test provided by authentication server system 135. According to such embodiment, application interface 185 may provide text boxes, radio buttons, drop down menus, and/or similar GUI objects for the purpose of displaying authentication text, promotional information, educational information, social networking indicia, and/or other aspects associated with a human authentication test.

Storage 173 may include authentication application data 187 associated with authentication application 183. Authentication I/O device interface 175 may be communicatively coupled to one or more image capture devices 189. The one or more image capture devices 189 may be incorporated into the authentication device 165. Additionally or alternatively, functionality of the one or more image capture devices 189 may be incorporated into one or more devices independent from authentication device 165. The one or more image capture devices 189 in the context of the various embodiments described herein may include scanning functions, photographic functions, and/or any other functions for the purpose of capturing image data or other data associated with an electronic or physical interface. More specifically, the one or more image capture devices 189 may be configured to scan at least one image of a human authentication test displayed on an application interface, e.g., application interface 121 of client application 119. CPU 177 is included in FIG. 1 to be representative of a single CPU, multiple CPUs, a single CPU having multiple processing cores, or the like. Authentication device network interface 179 may receive data from, and/or may transmit data to, authentication server system 135 and/or client computing system 105 via network 195. Authentication device 165 may be configured to interface with other computing systems, including other server systems, in computing infrastructure 100.

In an alternative embodiment, one or more functions related to facilitating resolution of a human authentication test according to the various embodiments described herein may be incorporated into client computing system 105. According to such alternative embodiment, client application 119 and authentication application 183 may interface directly with each other within client computing system 105 for the purpose of transferring data related to resolving a human authentication test. Additionally, according to such alternative embodiment, one or more functions of the one or more image capture devices 189 may be incorporated directly into client computing system 105.

In a further alternative embodiment, one or more functions related to facilitating resolution of a human authentication test according to the various embodiments described herein may be executed externally to authentication device 165. According to such alternative embodiment, authentication application 183 may communicate with one or more applications external to authentication device 165 in order to obtain information or results related to human authentication test resolution.

In a further alternative embodiment, all or some aspects of authentication server 149 may be stored externally to authentication server system 135. According to such alternative embodiment, authentication server application 151 may communicate with one or more applications external to authentication server system 135 in order to obtain some or all information related to such externally stored aspects. In a further alternative embodiment, all or some aspects of image server 153 may be stored externally to authentication server system 135. According to such alternative embodiment, image server application 155 may communicate with one or more applications external to authentication server system 135 in order to obtain some or all information related to such externally stored aspects.

Figure 2:
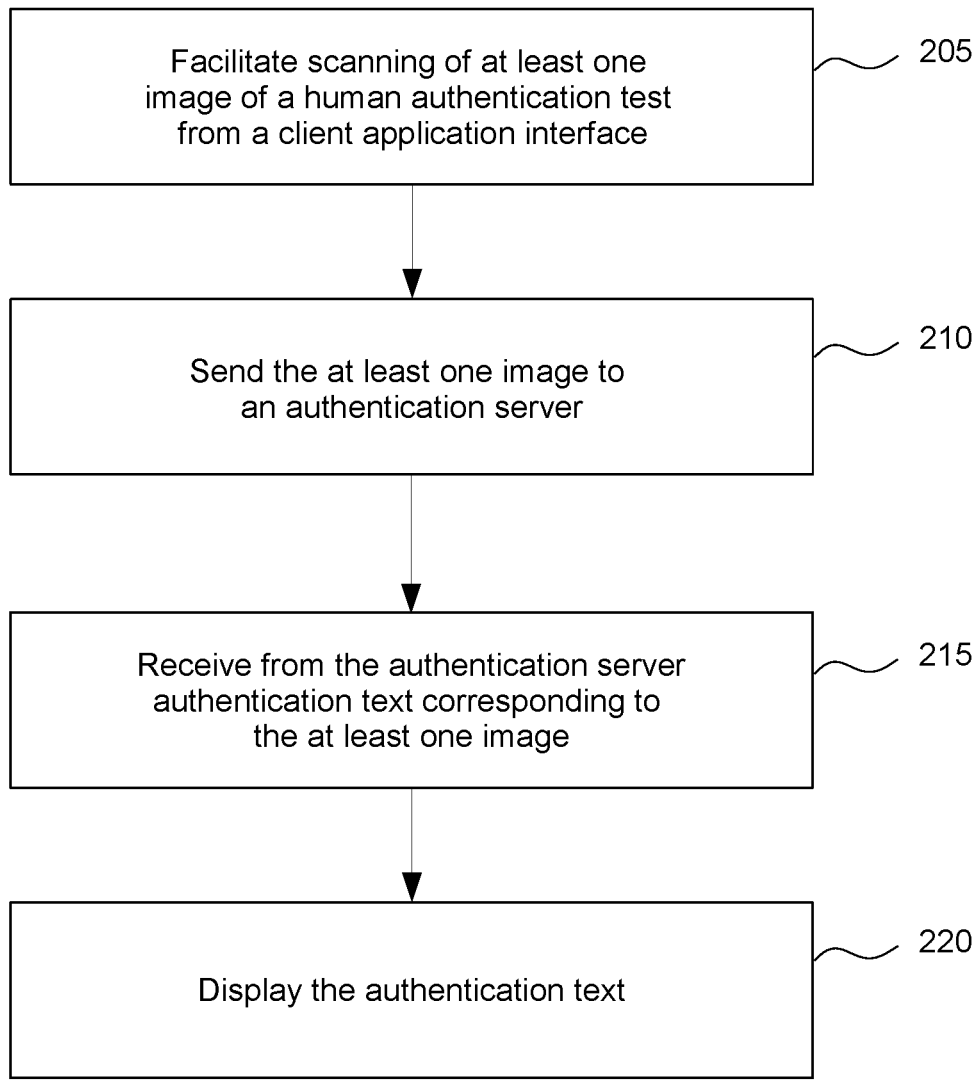
FIG. 2 illustrates a method of facilitating resolution of a human authentication test, according to an embodiment.

FIG. 2 illustrates a method 200 of facilitating resolution of a human authentication test, according to an embodiment. One or more steps associated with the method 200 and the other methods described herein may be carried out in a client-server computing environment (e.g., computing infrastructure 100). Additionally or alternatively, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment. An authentication application (e.g., authentication application 183) may facilitate processing according to the method 200. The authentication application may be located in an authentication device in the computing environment (e.g., authentication device 165). The authentication application may execute one or more steps of the method 200 upon a user of a client application of a client computing system (e.g., client application 119 of client computing system 105) encountering a human authentication test. For instance, the user may encounter the human authentication test on a network-accessible site (e.g., a webpage) accessed via a client application interface (e.g., application interface 121). In an embodiment, the human authentication test may include at least one image with a request that the user enter text identifying at least one designated aspect of the at least one image (e.g., the central subject of the at least one image). The user may consult the authentication application of the authentication device in order to facilitate resolution of the human authentication test.

The method 200 may begin at step 205, where the authentication application may facilitate scanning of the at least one image of the human authentication test from the client application interface. The at least one image of the human authentication test may be received from an image server of an authentication server system (e.g., image server 153 of authentication server system 135) for display via the client application interface. Furthermore, the at least one image of the human authentication test may be hosted by the image server. The at least one image may be encrypted for security purposes. The authentication application may facilitate scanning of the at least one image via one or more image capture devices (e.g., image capture device 189) associated with the authentication device. The authentication application may facilitate scanning of the at least one image according to step 205 by directing the one or more image capture devices to capture a photograph of the at least one image or otherwise capture image data with respect to the at least one image.

At step 210, the authentication application may send the at least one image scanned at step 205 to an authentication server of the authentication server system (e.g., authentication server 149 of authentication server system 135). At step 215, the authentication application may receive from the authentication server authentication text corresponding to the at least one image. Specifically, upon receiving the at least one image at step 210, the authentication server in turn may determine authentication text that corresponds to the at least one image of human authentication test and then may send the authentication text to the authentication application for receipt at step 215. The authentication text may pertain to at least one designated aspect of the at least one image (e.g., the central subject of the at least one image). Specific embodiments with respect to the authentication server determining the authentication text are described further herein.

At step 220, the authentication application may display the authentication text, which the user may use to address the human authentication test. More specifically, the authentication application may display the authentication text corresponding to the at least one image of human authentication test via an interface of the authentication application (e.g., authentication application interface 185). Accordingly, the user of the client application may view the authentication text via the authentication application interface and may enter and submit the authentication text via the client application interface in response to the human authentication test.

In an embodiment, at step 220 the authentication application further may display promotional information relating to one or more images among the at least one image. More specifically, the authentication application may display the promotional information via the authentication application interface such that the user of the client application may consume and/or interact with the promotional information. For instance, the authentication application may provide one or more links to advertisements associated with at least one designated aspect of the at least one image (e.g., the central subject of the at least one image and/or aspects associated therewith). In a further embodiment, in response to the user interacting with the promotional information, the authentication application may identify attributes relating to the user. For instance, the authentication application may identify a time at which the user viewed or interacted with the promotional information. Furthermore, the authentication application may identify the location at which the user viewed or interacted with the promotional information. The authentication application may track and store such identified attributes relating to the user, e.g., via a database. The authentication application may display the promotional information adjacent to the authentication text displayed at step 220.

In an additional embodiment, at step 220 the authentication application further may display educational information relating to one or more images among the at least one image. More specifically, the authentication application may display the educational information via the authentication application interface such that the user may consume the educational information. For instance, assuming that the at least one image depicts a location, the authentication application may provide historical facts associated with the location and/or other facts relevant to the location. As another example, assuming that the at least one image depicts an automobile, the authentication application may provide facts with regard to various characteristics of the automobile. The authentication application may track and store user activities with respect to the educational information, e.g., via a database. The authentication application may display the educational information adjacent to the authentication text displayed at step 220.

In an additional embodiment, at step 220 the authentication application further may display social networking indicia. More specifically, the authentication application may display the social networking indicia via the authentication application interface such that the user of the client application may interact with such indicia. Such social networking indicia may have a capability to relay information relating to one or more images among the at least one image to a social networking application. Such social networking indicia may include at least one link or icon which, responsive to being selected by the user of the client application, may facilitate posting of information related to the at least one image to a social networking profile, group, or other entity associated with the user. The authentication application may display the social networking indicia adjacent to the authentication text displayed at step 220. For instance, upon selection by the user of a social networking icon adjacent to the authentication text, the social networking application associated with the social networking icon may post information relating to the at least one image to a profile of the user within the social networking application. The social networking application may be incorporated into the client computing system, the authentication device, or another computing system within the computing environment. In an embodiment, a social networking interface associated with the social networking application may be incorporated into the client application and/or the authentication application. Alternatively, a social networking interface associated with the social networking application may be a separate entity within the client computing system, the authentication device, or another computing system within the computing environment.

In a further embodiment, the authentication application may request from the user registration credentials as a condition of displaying the authentication text at step 220. That is to say, display of the authentication text at step 220 may be contingent upon receipt of user registration credentials. According to such embodiment, the authentication application may use the registration credentials to facilitate collection of user data. Specifically, the authentication application may collect data with respect to quantity and/or frequency of user authentication requests. Such data may facilitate tracking, target advertising, statistical analysis, and/or identification of abusive users. In an embodiment, the authentication application may relay such data to the authentication server system or another computing system within the computing environment.

Figure 3:
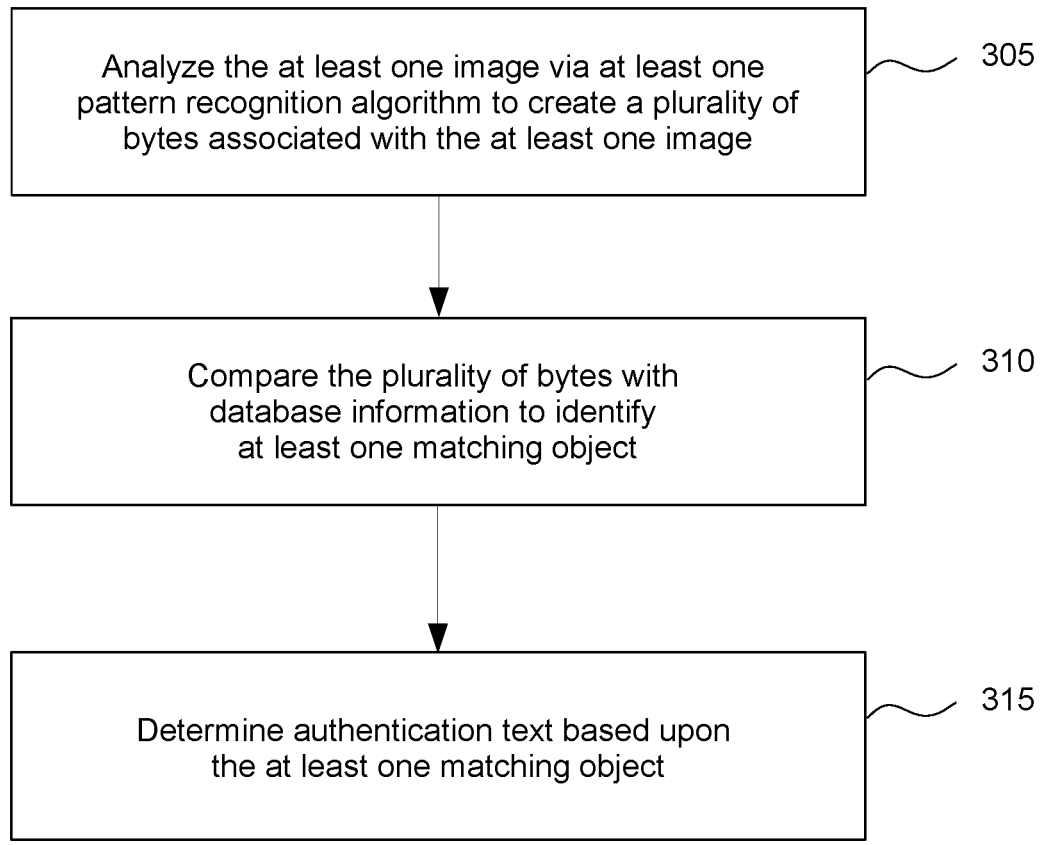
FIG. 3 illustrates a method of determining authentication text via an authentication server, according to an embodiment.

FIG. 3 illustrates a method 300 of determining the authentication text via the authentication server, according to an embodiment. Steps of the method 300 may be executed via an application in the authentication server (e.g., application server application 151). The method 300 may begin at step 305, where the authentication server may analyze the at least one image via at least one pattern recognition algorithm to create a plurality of bytes associated with the at least one image. According to step 305, the at least one image may be converted into a form compatible for comparison with database data. At step 310, the authentication server may compare the plurality of bytes associated with the at least one image with database information (e.g., information from databases 163) to identify at least one matching object.

At step 315 of the method 300, the authentication server may determine authentication text based upon the at least one matching object identified at step 310. Furthermore, the authentication server may determine metadata with respect to the authentication text. Such metadata may include the time at which the authentication text was determined. Such metadata further may include information with regard to any encryption algorithm used to secure the authentication text.

Figure 4:
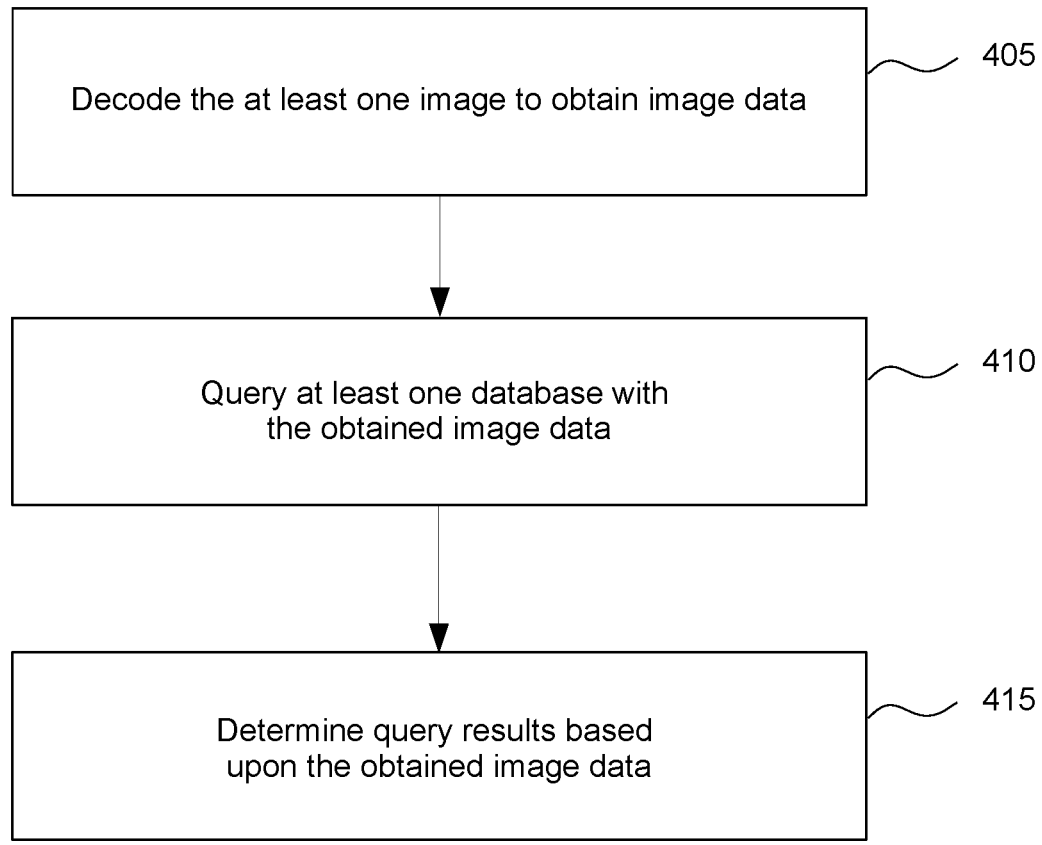
FIG. 4 illustrates a method of determining authentication text via an authentication server, according to an embodiment.

FIG. 4 illustrates a method 400 of determining the authentication text via the authentication server, according to an embodiment. Steps of the method 400 may be executed via an application in the authentication server (e.g., application server application 151). The method 400 may begin at step 405, where the authentication server may decode the at least one image to obtain image data. In an embodiment, the decoding of the at least one image according to step 305 may incorporate use of an optical character recognition algorithm (OCR algorithm). Decoding via an OCR algorithm may enable the authentication server to decode any textual aspect within the at least one image. For instance, assuming that the at least one image includes an automobile, decoding via an OCR algorithm may enable the authentication server to decode any visible text on a license plate associated with the automobile such that the decoded text may be included in the obtained image data.

At step 410 of the method 400, the authentication server may query at least one database with the image data obtained at step 405 (e.g., databases 163 may be queried via DBMS 157). At step 415, the authentication server may determine query results based upon the obtained image data. The query results obtained at step 415 may include the authentication text. Furthermore, the query results may include metadata with respect to the authentication text. Such metadata may include the time at which the authentication text was obtained from the at least one database. Such metadata further may include information with regard to any encryption algorithm used to secure the authentication text.

Figure 5A:
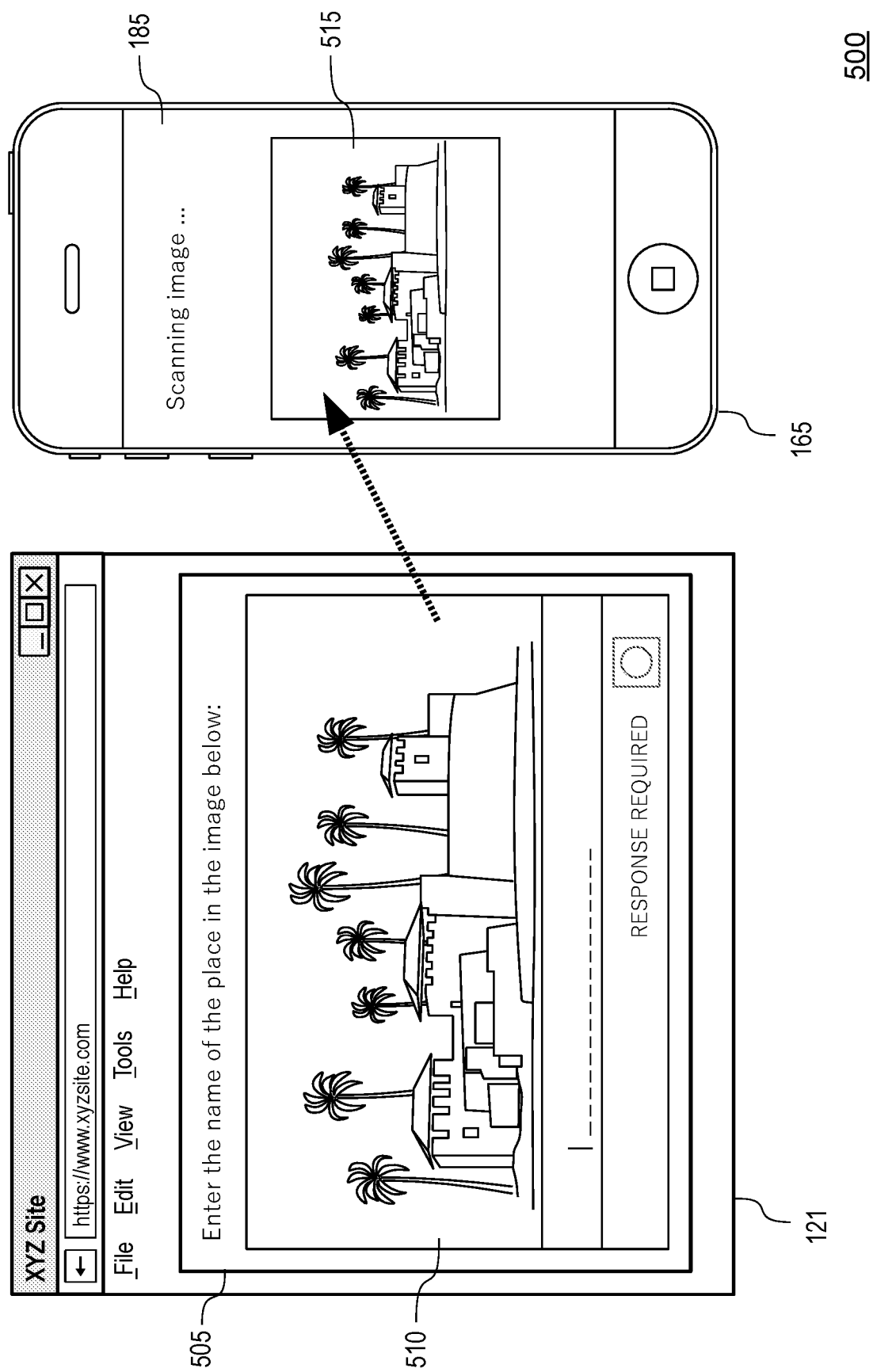
FIGS. 5A-5C illustrate an example scenario involving a human authentication test addressed according to the various embodiments described herein.
Figure 5B:
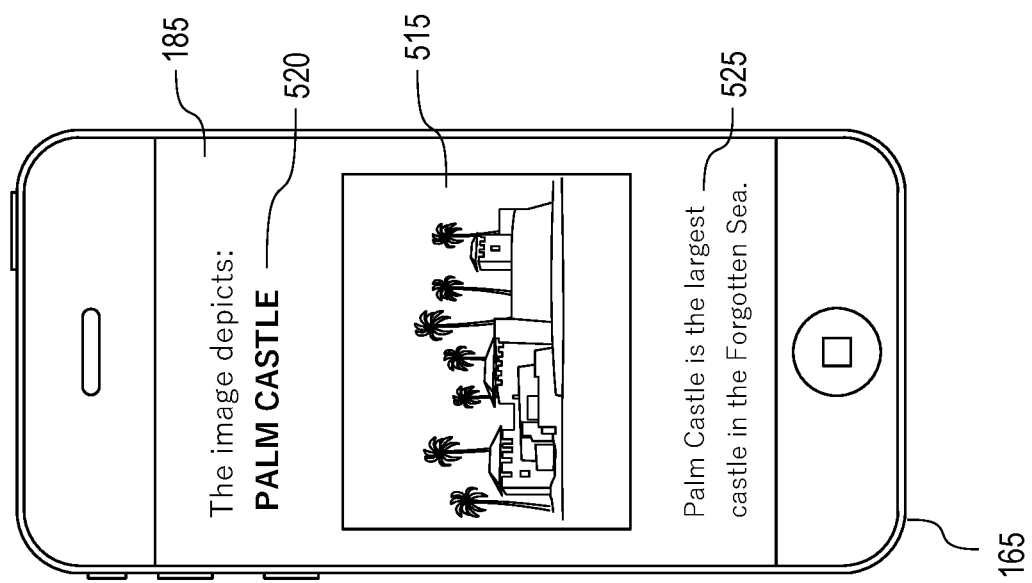
Figure 5B:
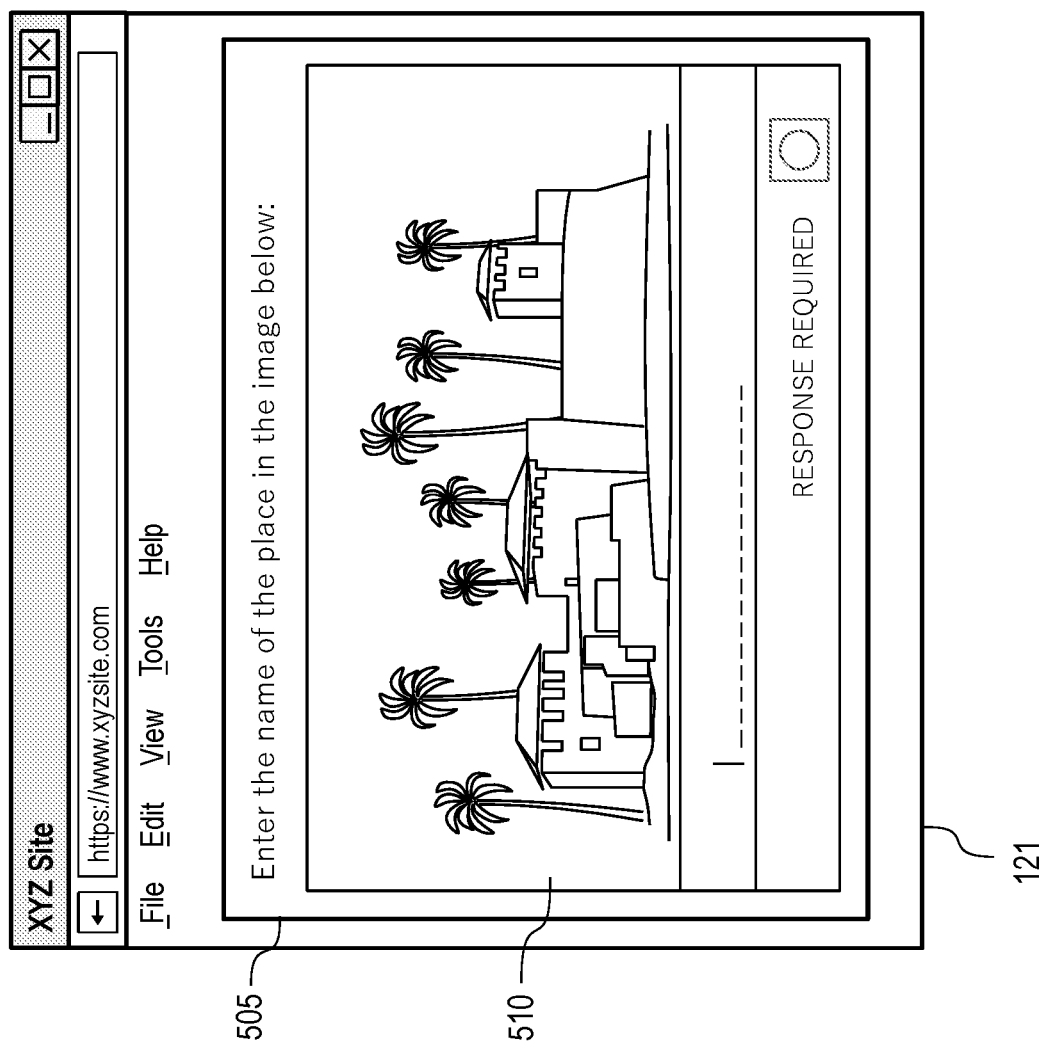
Figure 5C:
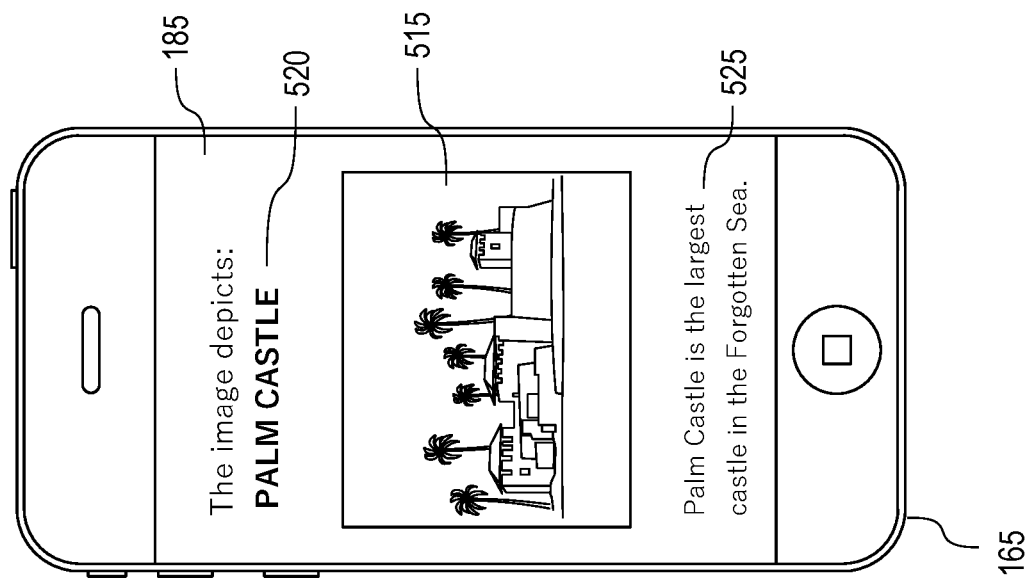
Figure 5C:
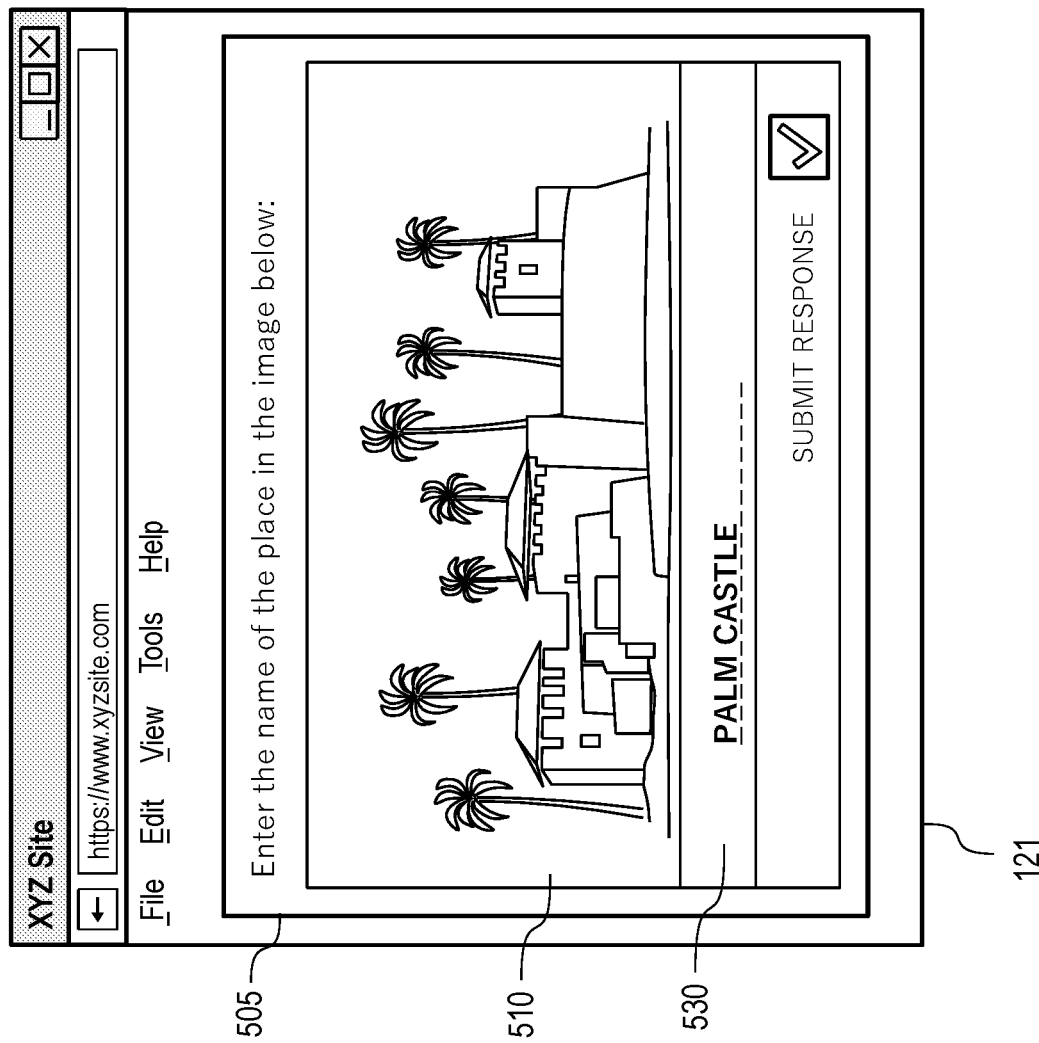

FIGS. 5A-5C illustrate an example scenario 500 according to the various embodiments described herein. Specifically, the example scenario 500 as depicted in FIGS. 5A-5C demonstrates how authentication application 183 of authentication device 165 may facilitate resolution of a human authentication test in accordance with the method 200.

As shown in FIG. 5A, client application interface 121 may display a human authentication test 505 having an image 510. Image 510 pertains to a location. According to step 205 of the method 200, authentication application 183 of authentication device 165 may facilitate scanning of image 510 of human authentication test 505. Image 510 may be scanned via one or more image capture devices 189 associated with authentication device 165. Authentication application 183 may display a scanned version 515 of image 510 within authentication application interface 185. According to step 210, authentication application 183 may send a scanned version 515 of image 510 to authentication server 149 of authentication server system 135.

According to steps 215 and 220, authentication application 183 may receive from authentication server 149 authentication text corresponding to image 510, and as illustrated in FIG. 5B authentication application 183 may display authentication text 520 within authentication application interface 185. Furthermore, authentication application 183 may display within authentication application interface 185 educational information 525 relating to image 510. As illustrated in FIG. 5C, the user of client application 119 may respond to human authentication test 505 by consulting authentication text 520 via authentication application interface 185 and then entering authentication text 520 in authentication text box 530 within client application interface 121.

Figure 6A:
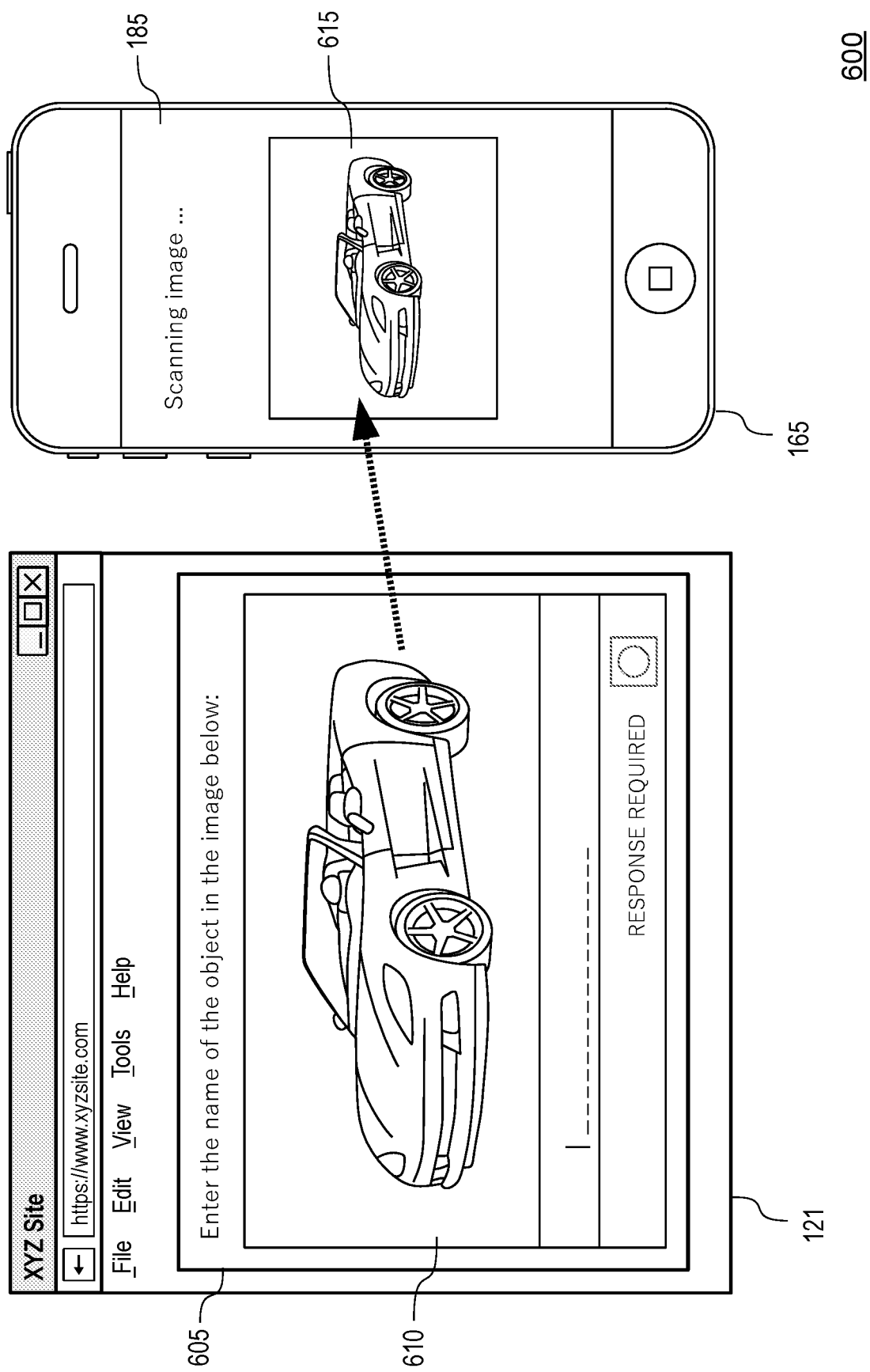
FIGS. 6A-6C illustrate a further example scenario involving a human authentication test addressed according to the various embodiments described herein.
Figure 6B:
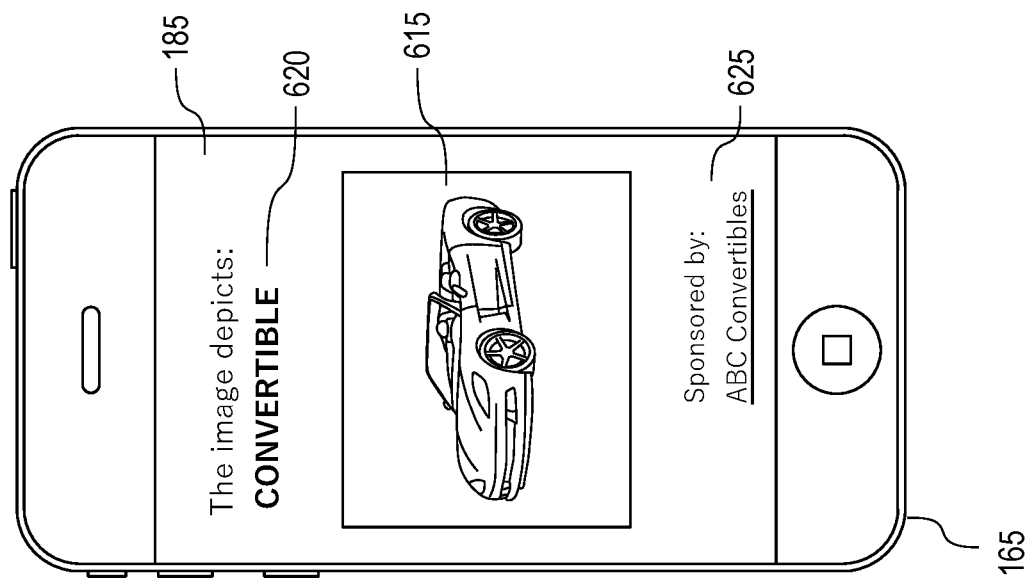
Figure 6B:
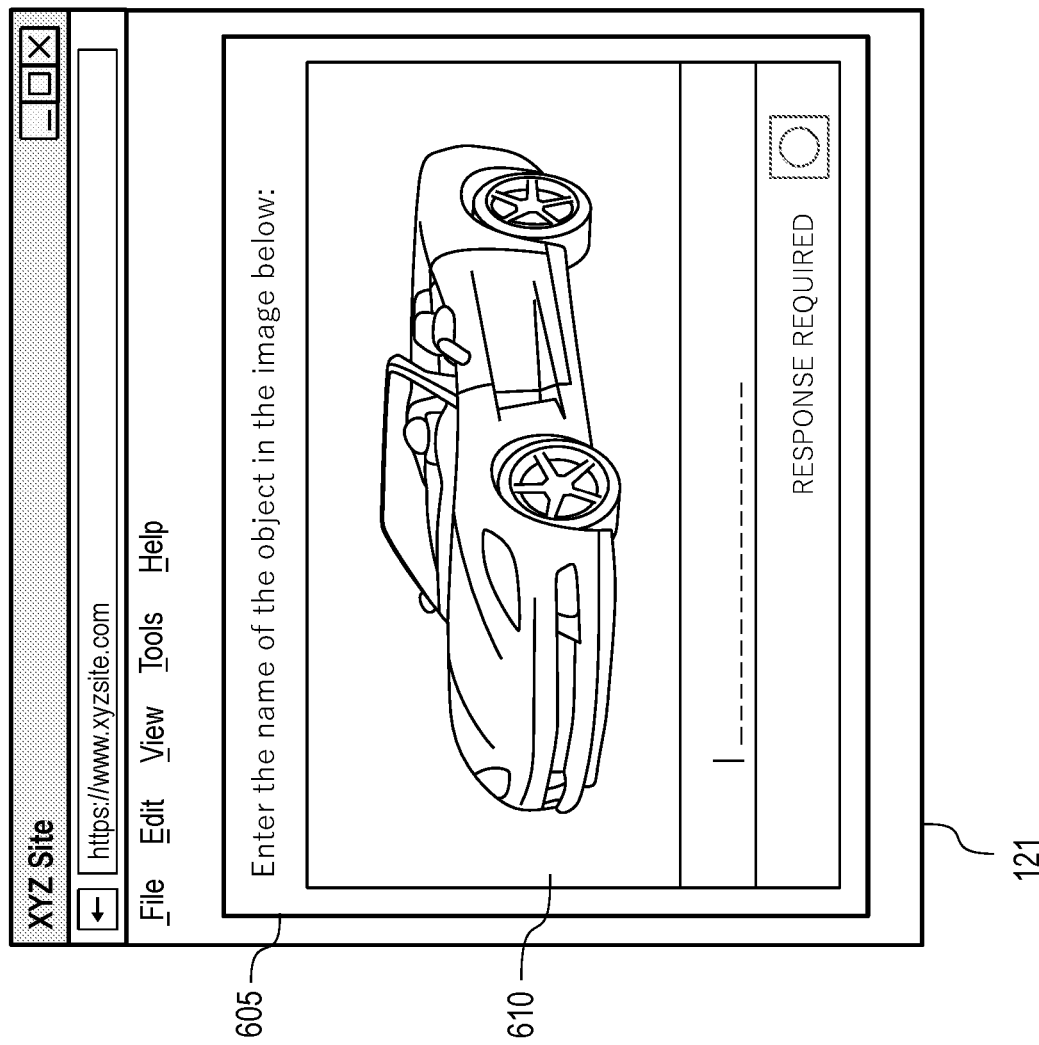
Figure 6C:
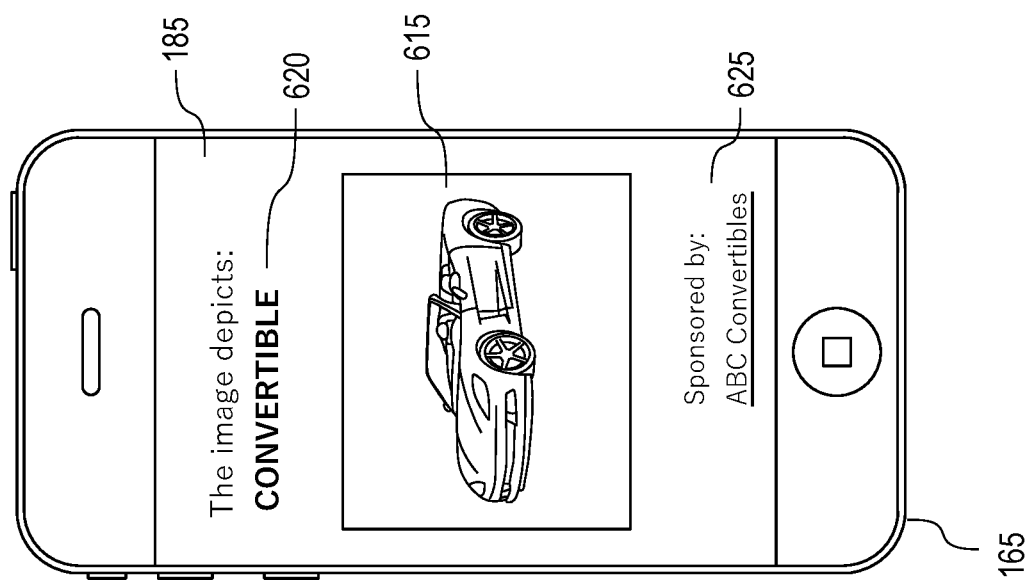
Figure 6C:
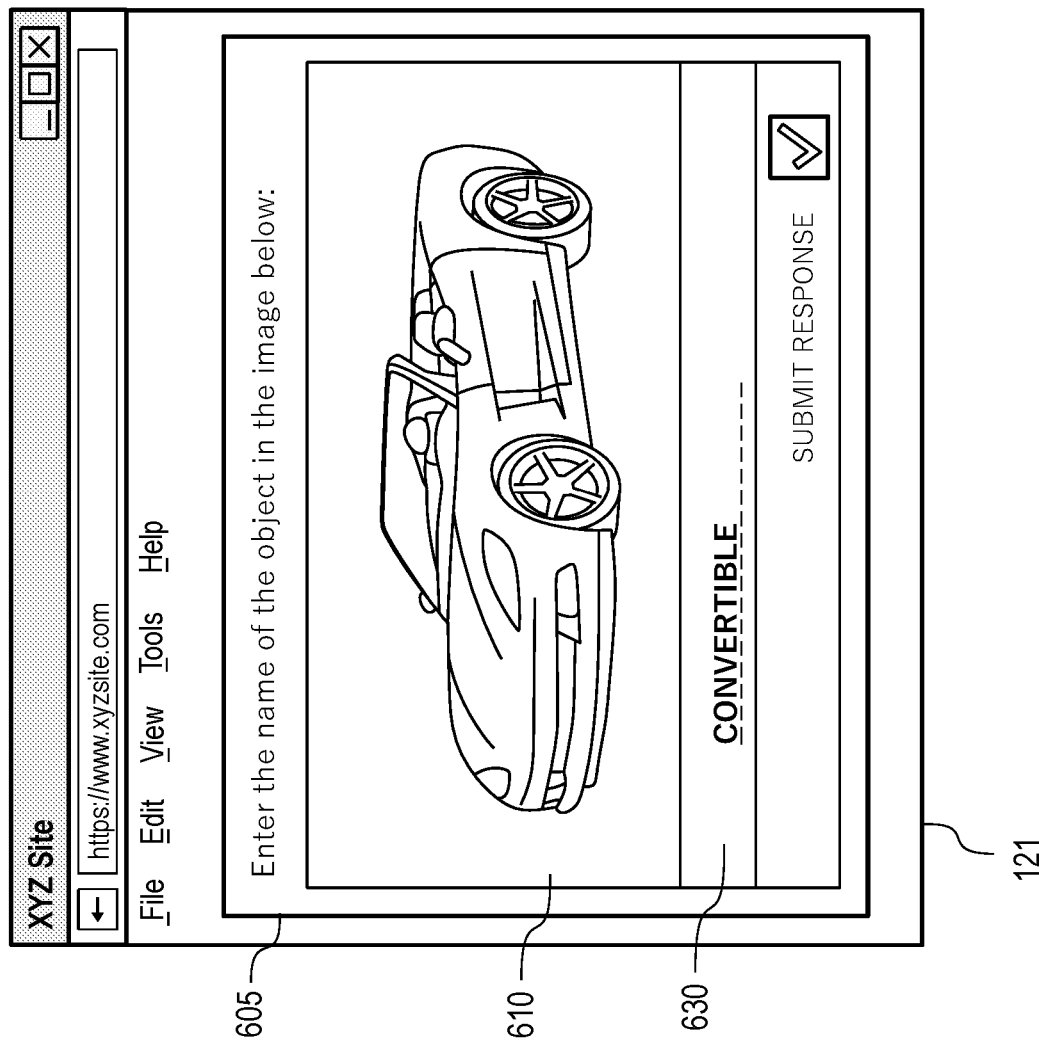

FIGS. 6A-6C illustrate a further example scenario 600 according to the various embodiments described herein. Specifically, the example scenario 600 as depicted in FIGS. 6A-6C demonstrates how authentication application 183 of authentication device 165 may facilitate resolution of a human authentication test in accordance with the method 200.

As shown in FIG. 6A, client application interface 121 may display a human authentication test 605 having an image 610. Image 610 pertains to an object. According to step 205 of the method 200, authentication application 183 of authentication device 165 may facilitate scanning of image 610 of human authentication test 605. Image 610 may be scanned via one or more image capture devices 189 associated with authentication device 165. Authentication application 183 may display a scanned version 615 of image 610 within authentication application interface 185. According to step 210, authentication application 183 may send scanned version 615 of image 610 to authentication server 149 of authentication server system 135.

According to steps 215 and 220, authentication application 183 may receive from authentication server 149 authentication text corresponding to image 610, and as illustrated in FIG. 6B authentication application 183 may display authentication text 620 within authentication application interface 185. Furthermore, authentication application 183 may display within authentication application interface 185 promotional information 625 relating to image 610. More specifically, promotional information 625 may include a link to a merchant selling merchandise relating to the object depicted in image 610 (according to example scenario 600, the merchant may sell convertibles). As illustrated in FIG. 6C, the user of client application 119 may respond to human authentication test 605 by consulting authentication text 620 via authentication application interface 185 and then entering authentication text 620 in authentication text box 630 within client application interface 121.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
facilitating scanning of at least one image of a human authentication test from a client application interface prior to authentication analysis, wherein the human authentication test is received from an image server of an authentication server system for display via the interface, and wherein the at least one image is scanned via an image capture device;
upon facilitating scanning of the at least one image, sending to an authentication server of the authentication server system the at least one image;
receiving from the authentication server authentication text corresponding to the at least one image, wherein the authentication server determines the authentication text by:
analyzing the at least one image via at least one pattern recognition algorithm to create a plurality of bytes associated with the at least one image, and
comparing the plurality of bytes with database information to identify at least one matching object based upon which the authentication text is determined; and
displaying the authentication text for entry via the client application interface in response to the human authentication test.

2. The method of claim 1, further comprising:
displaying promotional information relating to one or more images among the at least one image.

3. The method of claim 2, further comprising:
responsive to a user interacting with the promotional information, identifying attributes relating to the user.

4. The method of claim 1, further comprising:
displaying educational information relating to one or more images among the at least one image.

5. The method of claim 1, further comprising:
displaying social networking indicia having a capability to relay information relating to one or more images among the at least one image to a social networking application.

6. The method of claim 1, further comprising:
requesting from a user registration credentials as a condition of displaying the authentication text, wherein the registration credentials are used to facilitate collection of data relating to the user.

7. A computer program product comprising a computer readable storage medium having program instructions embodied therewith, the program instructions executable by a computing device to cause the computing device to:
facilitate scanning of at least one image of a human authentication test from a client application interface prior to authentication analysis, wherein the human authentication test is received from an image server of an authentication server system for display via the interface, and wherein the at least one image is scanned via an image capture device;
upon facilitating scanning of the at least one image, send to an authentication server of the authentication server system the at least one image;
receive from the authentication server authentication text corresponding to the at least one image, wherein the authentication server determines the authentication text by:
analyzing the at least one image via at least one pattern recognition algorithm to create a plurality of bytes associated with the at least one image, and
comparing the plurality of bytes with database information to identify at least one matching object based upon which the authentication text is determined; and
display the authentication text for entry via the client application interface in response to the human authentication test.

8. The computer program product of claim 7, wherein the program instructions further cause the computing device to:
display promotional information relating to one or more images among the at least one image.

9. The computer program product of claim 8, wherein the program instructions further cause the computing device to:
responsive to a user interacting with the promotional information, identify attributes relating to the user.

10. The computer program product of claim 7, wherein the program instructions further cause the computing device to:
display social networking indicia having a capability to relay information relating to one or more images among the at least one image to a social networking application.

11. The computer program product of claim 7, wherein the program instructions further cause the computing device to:

display educational information relating to one or more images among the at least one image.

12. The computer program product of claim 7, wherein the program instructions further cause the computing device to:
request from a user registration credentials as a condition of displaying the authentication text, wherein the registration credentials are used to facilitate collection of data relating to the user.

13. A system comprising:
a processor; and
a memory storing an application program, which, when executed on the processor, performs an operation comprising:
facilitating scanning of at least one image of a human authentication test from a client application interface prior to authentication analysis, wherein the human authentication test is received from an image server of an authentication server system for display via the interface, and wherein the at least one image is scanned via an image capture device;
upon facilitating scanning of the at least one image, sending to an authentication server of the authentication server system the at least one image;
receiving from the authentication server authentication text corresponding to the at least one image, wherein the authentication server determines the authentication text by:
analyzing the at least one image via at least one pattern recognition algorithm to create a plurality of bytes associated with the at least one image, and comparing the plurality of bytes with database information to identify at least one matching object based upon which the authentication text is determined; and
displaying the authentication text for entry via the client application interface in response to the human authentication test.

14. The system of claim 13, wherein the operation further comprises:
displaying promotional information relating to one or more images among the at least one image.

15. The system of claim 14, wherein the operation further comprises:
responsive to a user interacting with the promotional information, identifying attributes relating to the user.

16. The system of claim 13, wherein the operation further comprises:
displaying educational information relating to one or more images among the at least one image.

17. The system of claim 13, wherein the operation further comprises:
displaying social networking indicia having a capability to relay information relating to one or more images among the at least one image to a social networking application.

18. The system of claim 13, wherein the operation further comprises:
requesting from a user registration credentials as a condition of displaying the authentication text, wherein the registration credentials are used to facilitate collection of data relating to the user.

* * * * *